(12) United States Patent
Choi et al.

(10) Patent No.: US 10,403,876 B2
(45) Date of Patent: Sep. 3, 2019

(54) ELECTRODE LEAD CONNECTING STRUCTURE, BATTERY MODULE COMPRISING ELECTRODE LEAD CONNECTING STRUCTURE, AND BATTERY PACK COMPRISING BATTERY MODULE

(71) Applicant: LG CHEM, LTD., Seoul (KR)

(72) Inventors: Yong-Joon Choi, Daejeon (KR);
Ki-Youn Kim, Daejeon (KR);
Duck-Hee Moon, Daejeon (KR);
Jun-Yeob Seong, Daejeon (KR);
Sung-Chun Yu, Daejeon (KR);
Gang-U Lee, Daejeon (KR);
Jung-Hang Lee, Daejeon (KR);
Sang-Yoon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/574,239

(22) PCT Filed: Jul. 11, 2016

(86) PCT No.: PCT/KR2016/007525
§ 371 (c)(1),
(2) Date: Nov. 15, 2017

(87) PCT Pub. No.: WO2017/014472
PCT Pub. Date: Jan. 26, 2017

(65) Prior Publication Data
US 2018/0138484 A1 May 17, 2018

(30) Foreign Application Priority Data

Jul. 20, 2015 (KR) ........................ 10-2015-0102609

(51) Int. Cl.
*H01M 2/22* (2006.01)
*H01M 2/20* (2006.01)
(Continued)

(52) U.S. Cl.
CPC ............. *H01M 2/206* (2013.01); *H01M 2/10* (2013.01); *H01M 2/1077* (2013.01); *H01M 2/20* (2013.01);
(Continued)

(58) Field of Classification Search
CPC ............. H01M 2/206; H01M 10/4257; H01M 2/1077; H01M 10/425; H01M 2/204;
(Continued)

(56) References Cited

U.S. PATENT DOCUMENTS

2006/0214631 A1 9/2006 Yoon et al.
2013/0143086 A1* 6/2013 Lee ..................... H01M 2/1077
429/91

(Continued)

FOREIGN PATENT DOCUMENTS

EP 2 447 966 A1 5/2012
KR 10-2014-0093424 A 7/2014
(Continued)

OTHER PUBLICATIONS

International Search Report for PCT/KR2016/007525 dated Oct. 21, 2016.

*Primary Examiner* — Cynthia K Walls
(74) *Attorney, Agent, or Firm* — Birch, Stewart, Kolasch & Birch, LLP

(57) ABSTRACT

Disclosed are an electrode lead connecting structure capable of simplifying an assembly process of busbars by integrating sensing and electrode busbars, and of minimizing worker's mistakes during the assembly process by almost horizontally arranging busbars on a printed circuit board for each level, a battery module including the electrode lead connecting structure, and a battery pack including the battery module. An electrode lead connecting structure according to the present disclosure includes a printed circuit board, first and (Continued)

second electrode-integrated sensing busbars provided at a lowest level of one side edge of the printed circuit board and at a highest level of an opposite side edge of the printed circuit board, respectively, a first sensing busbar group located on the first L-shaped end strip busbar at the one side edge, and a second sensing busbar group located under the second L-shaped end strip busbar at the opposite side edge.

15 Claims, 10 Drawing Sheets

(51) Int. Cl.
  *H01M 2/10* (2006.01)
  *H01M 10/42* (2006.01)
(52) U.S. Cl.
  CPC ............ *H01M 2/202* (2013.01); *H01M 2/204* (2013.01); *H01M 10/425* (2013.01); *H01M 10/4257* (2013.01); *H01M 2010/4271* (2013.01); *H01M 2220/20* (2013.01)

(58) Field of Classification Search
  CPC .......... H01M 2/202; H01M 2/10; H01M 2/20; H01M 2010/4271; H01M 2220/20
  See application file for complete search history.

(56) References Cited

U.S. PATENT DOCUMENTS

| | | |
|---|---|---|
| 2013/0288530 A1 | 10/2013 | Zhao |
| 2015/0072196 A1 | 3/2015 | Soleski et al. |
| 2016/0234928 A1 | 8/2016 | Nakamura |
| 2016/0268652 A1 | 9/2016 | Eom et al. |

FOREIGN PATENT DOCUMENTS

| | | |
|---|---|---|
| KR | 10-2014-0093997 A | 7/2014 |
| KR | 10-1426612 B1 | 8/2014 |
| KR | 10-2015-0062743 A | 6/2015 |
| KR | 10-2015-0062777 A | 6/2015 |
| KR | 10-2015-0067694 A | 6/2015 |
| WO | WO 2015/045767 A1 | 4/2015 |

* cited by examiner

ELECTRODE LEAD CONNECTING STRUCTURE, BATTERY MODULE COMPRISING ELECTRODE LEAD CONNECTING STRUCTURE, AND BATTERY PACK COMPRISING BATTERY MODULE

TECHNICAL FIELD

The present disclosure relates to an electrode lead connecting structure capable of simplifying an assembly process of components by integrating some of the components thereof, and of minimizing worker's mistakes during the assembly process by almost horizontally arranging each of the components for each level, a battery module including the electrode lead connecting structure, and a battery pack including the battery module.

The present application claims priority to Korean Patent Application No. 10-2015-0102609 filed on Jul. 20, 2015 in the Republic of Korea, the disclosure of which is incorporated herein by reference.

BACKGROUND ART

Currently, to reduce air pollution due to vehicle exhaust gas, vehicles are being produced based on research conducted to ensure driving force using an internal combustion engine and/or an electric motor. As such, the vehicles have been evolved in the order of hybrid vehicles, plug-in hybrid vehicles, and electric vehicles. In this case, the hybrid vehicles and the plug-in hybrid vehicles include an internal combustion engine, an electric motor, and a battery pack, and the electric vehicles do not include an internal combustion engine but include an electric motor and a battery pack.

The battery pack has been evolved along with the hybrid vehicles, the plug-in hybrid vehicles, and the electric vehicles. The battery pack is configured to be rechargeable inside and outside an electric vehicle. The battery pack includes a battery module including battery cells, and an interconnect board (ICB) assembly (hereinafter referred to as an 'electrode lead connecting structure') electrically connected to the battery cells). The battery cells are sequentially and vertically stacked on one another in one direction. Each battery cell includes two electrode leads extending in one direction.

The electrode lead connecting structure is electrically connected to a battery management system (BMS), and includes a printed circuit board, a plurality of sensing busbars, and two electrode busbars. The printed circuit board is provided in a rectangular shape and includes an electrical circuit configured to measure voltages of the battery cells. Equal numbers of the sensing busbars are arranged at opposite edges of the printed circuit board. That is, pairs of the sensing busbars are alternately arranged at one side edge and an opposite side edge of the printed circuit board.

The sensing busbars are electrically connected to the printed circuit board to sense the voltages of the battery cells. The two electrode busbars are separately welded to a highest-potential sensing busbar, which receives the highest potential, and a lowest-potential sensing busbar, which receives the lowest potential, among the sensing busbars. The highest-potential sensing busbar corresponds to a bottom sensing busbar among the sensing busbars arranged at the one side edge of the printed circuit board, and the lowest-potential sensing busbar corresponds to a top sensing busbar among the sensing busbars arranged at the opposite side edge of the printed circuit board.

The electrode busbars receive power from the battery management system and supplies the power to the electrode lead connecting structure. In this case, the electrode lead connecting structure is located adjacent to the electrode leads of the battery cells and is configured to electrically interconnect the battery cells in series using the printed circuit board based on coupling among the sensing busbars, the two electrode busbars, and the electrode leads of the battery cells. The sensing busbars, the two electrode busbars, and the electrode leads of the battery cells are coupled to each other by welding one electrode lead to each electrode busbar and welding two electrode leads to each of the sensing busbars other than the highest-potential sensing busbar and the lowest-potential sensing busbar.

The electrode lead connecting structure senses the voltage of each battery cell using the printed circuit board and transmits an electrical signal about the sensed voltage to the battery management system. However, the electrode busbar is welded twice to be coupled to the highest-potential sensing busbar or the lowest-potential sensing busbar, and to be coupled to the electrode lead. The number of welding processes increases man-hours required to produce a battery pack. Furthermore, the probability that the welded part of the electrode busbar is separated from the sensing busbar and/or the electrode lead due to vibration of the vehicle or impact from a peripheral structure of the electrode lead connecting structure is very high.

Separation of the electrode busbar from the sensing busbar disables supply of power to the electrode busbar and deteriorates electrical characteristics of the electrode lead connecting structure, and separation of the electrode lead from the electrode busbar disables measurement of the voltage of the battery cell corresponding to the electrode busbar using the printed circuit board. In addition, since pairs of the sensing busbars are alternately arranged at the one side edge and the opposite side edge of the printed circuit board, at least one of the sensing busbars may not be bonded to the electrode lead of the battery cell due to a mistake.

DISCLOSURE

Technical Problem

The present disclosure is designed to solve the problems of the related art, and therefore the present disclosure is directed to providing an electrode lead connecting structure capable of reducing man-hours of a worker by integrating electrode busbars with each of sensing busbars having the highest and lowest potentials among a plurality of sensing busbars electrically connected to a printed circuit board.

The present disclosure is also directed to providing a battery module including an electrode lead connecting structure capable of minimizing worker's mistakes of not bonding some of electrode leads of battery cells to a plurality of sensing busbars located at opposite edges of a printed circuit board, and a battery pack including the battery module.

Technical Solution

In one aspect of the present disclosure, there is provided an electrode lead connecting structure including a printed circuit board having a rectangular shape and including an electrical circuit pattern, a first electrode-integrated sensing busbar including a first L-shaped end strip busbar electrically connected to the electrical circuit pattern at a lowest level of one side edge of the printed circuit board, and a first electrode busbar protruding downward from the first L-shaped end strip busbar, bent perpendicularly to the first L-shaped end strip busbar, and extending in a plate shape, a second electrode-integrated sensing busbar including a second L-shaped end strip busbar electrically connected to the electrical circuit pattern at a highest level of an opposite side edge of the printed circuit board, and a second electrode busbar protruding upward from the second L-shaped end strip busbar, bent perpendicularly to the second L-shaped end strip busbar, and extending in a plate shape, a first sensing busbar group including first L-shaped middle strip busbars electrically connected to the electrical circuit pattern at the one side edge and regularly arranged on the first L-shaped end strip busbar, and a second sensing busbar group including second L-shaped middle strip busbars electrically connected to the electrical circuit pattern at the opposite side edge and regularly arranged under the second L-shaped end strip busbar.

According to the present disclosure, the second L-shaped end strip busbar may be located higher than the first L-shaped end strip busbar on the printed circuit board.

Preferably, a width of a central region of the first L-shaped end strip busbar or the second L-shaped end strip busbar may be greater than a width of an edge region thereof, which is adjacent to or away from the printed circuit board along a length direction extending from the printed circuit board.

More preferably, the first L-shaped middle strip busbars may have the same width as the second L-shaped middle strip busbars along length directions extending from the printed circuit board.

In one aspect, the first L-shaped end strip busbar, the first L-shaped middle strip busbars, the second L-shaped end strip busbar, and the second L-shaped middle strip busbars may be inserted into the printed circuit board and electrically connected to the electrical circuit pattern, through ends thereof that are bent in L shapes.

In another aspect, the first L-shaped end strip busbar and the first L-shaped middle strip busbars may have the same length as the second L-shaped end strip busbar and the second L-shaped middle strip busbars from the printed circuit board.

In another aspect, a distance between the first L-shaped end strip busbar and a first L-shaped middle strip busbar adjacent to the first L-shaped end strip busbar may be less than a distance between the second L-shaped end strip busbar and a second L-shaped middle strip busbar adjacent to the second L-shaped end strip busbar.

In another aspect, a distance between the first L-shaped middle strip busbars may equal a distance between the second L-shaped middle strip busbars.

In another aspect, a distance between the first L-shaped middle strip busbars or the second L-shaped middle strip busbars may equal a distance between the first L-shaped end strip busbar and a first L-shaped middle strip busbar adjacent to the first L-shaped end strip busbar, and may be less than a distance between the second L-shaped end strip busbar and a second L-shaped middle strip busbar adjacent to the second L-shaped end strip busbar.

According to the present disclosure, the first L-shaped end strip busbar and a second L-shaped middle strip busbar, which horizontally face each other at the lowest level of the printed circuit board, may have centers at the same level in central regions of the first L-shaped end strip busbar and the second L-shaped middle strip busbar.

Preferably, a first L-shaped middle strip busbar and the second L-shaped end strip busbar, which horizontally face each other at the highest level of the printed circuit board, may have centers diagonally facing each other in central regions of the first L-shaped middle strip busbar and the second L-shaped end strip busbar.

According to the present disclosure, the first electrode busbar may be integrated with the first L-shaped end strip busbar, and the second electrode busbar may be integrated with the second L-shaped end strip busbar.

Preferably, the first electrode busbar may protrude from the first L-shaped end strip busbar in a '⌊' shape, and the second electrode busbar may protrude from the second L-shaped end strip busbar in a '⌉' shape.

In one aspect, the first electrode busbar and the first L-shaped end strip busbar may define a groove, which is open upward, and the second electrode busbar and the second L-shaped end strip busbar may define a groove, which is open downward.

In another aspect of the present disclosure, there is also provided a battery module including the above-described electrode lead connecting structure, and a plurality of battery cells coupled to the electrode lead connecting structure and sequentially stacked on one another, wherein electrode leads of the battery cells include a bottom left electrode lead and left lead stacks sequentially stacked on one another at a left side to extend in one direction, and right lead stacks and a top right electrode lead sequentially stacked on one another at a right side, and wherein the bottom left electrode lead is welded to the first L-shaped end strip busbar with a bent end of the bottom left electrode lead hooked on the first L-shaped end strip busbar, each of the left lead stacks are welded to each of the first L-shaped middle strip busbars with bent ends of two electrode leads of each of the left lead stacks hooked on each of the first L-shaped middle strip busbars, the top right electrode lead is welded to the second L-shaped end strip busbar with a bent end of the top right electrode lead hooked on the second L-shaped end strip busbar, and each of the right lead stacks are welded to each of the second L-shaped middle strip busbars with bent ends of two electrode leads of each of the right lead stacks hooked on each of the second L-shaped middle strip busbars.

According to the present disclosure, a distance between the first L-shaped middle strip busbars or the second L-shaped middle strip busbars may equal a distance between the first L-shaped end strip busbar and a first L-shaped middle strip busbar adjacent to the first L-shaped end strip busbar, and may be less than a distance between the second L-shaped end strip busbar and a second L-shaped middle strip busbar adjacent to the second L-shaped end strip busbar.

According to the present disclosure, the first electrode busbar may be integrated with the first L-shaped end strip busbar, and the second electrode busbar may be integrated with the second L-shaped end strip busbar.

According to the present disclosure, the bent end of the bottom left electrode lead or the bent end of each electrode lead of the left lead stacks may form a groove, which is open downward in an almost '⊏'-shape.

Preferably, the bent end of the top right electrode lead may form a groove, which is open upward in an almost '⊏'-shape, and the bent end of each electrode lead of the right lead stacks may form a groove, which is open downward in an almost '⊏'-shape.

In another aspect of the present disclosure, there is also provided a battery pack including the above-described battery module, and a housing surrounding the battery module, wherein the housing includes first and second external electrode terminals electrically connected to first and second electrode terminals of the electrode lead connecting structure in the battery module, and wherein the first and second external electrode terminals protrude from the housing.

Advantageous Effects

An electrode lead connecting structure according to the present disclosure includes electrode-integrated sensing busbars generated by integrating electrode busbars with highest-potential and lowest-potential sensing busbars among a plurality of sensing busbars electrically connected to a printed circuit board, and thus may reduce man-hours by preventing repeated assembly processes of electrode busbars and sensing busbars.

A battery module according to the present disclosure arranges equal numbers of sensing busbars at one side edge and an opposite side edge of a printed circuit board to provide a pair of two sensing busbars for each level, and thus may minimize mistakes of not bonding some of electrode leads of battery cells to a plurality of sensing busbars.

A battery module according to the present disclosure has a width of an electrode lead of a battery cell, which is less than a length of a sensing busbar protruding from a printed circuit board, and thus may easily weld the electrode lead to the sensing busbar by stably putting the electrode lead into surface-to-surface contact with the sensing busbar.

A battery pack according to the present disclosure includes a high-productivity battery module produced by reducing man-hours and minimizing assembly mistakes, and thus may reduce manufacturing costs.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the following description, a battery cell refers to a lithium secondary battery. Herein, the lithium secondary battery refers to any secondary battery in which lithium ions serve as operating ions during charge and discharge and cause electrochemical reaction at positive and negative electrodes. However, the present disclosure is not limited by a battery type.

Figure 1:
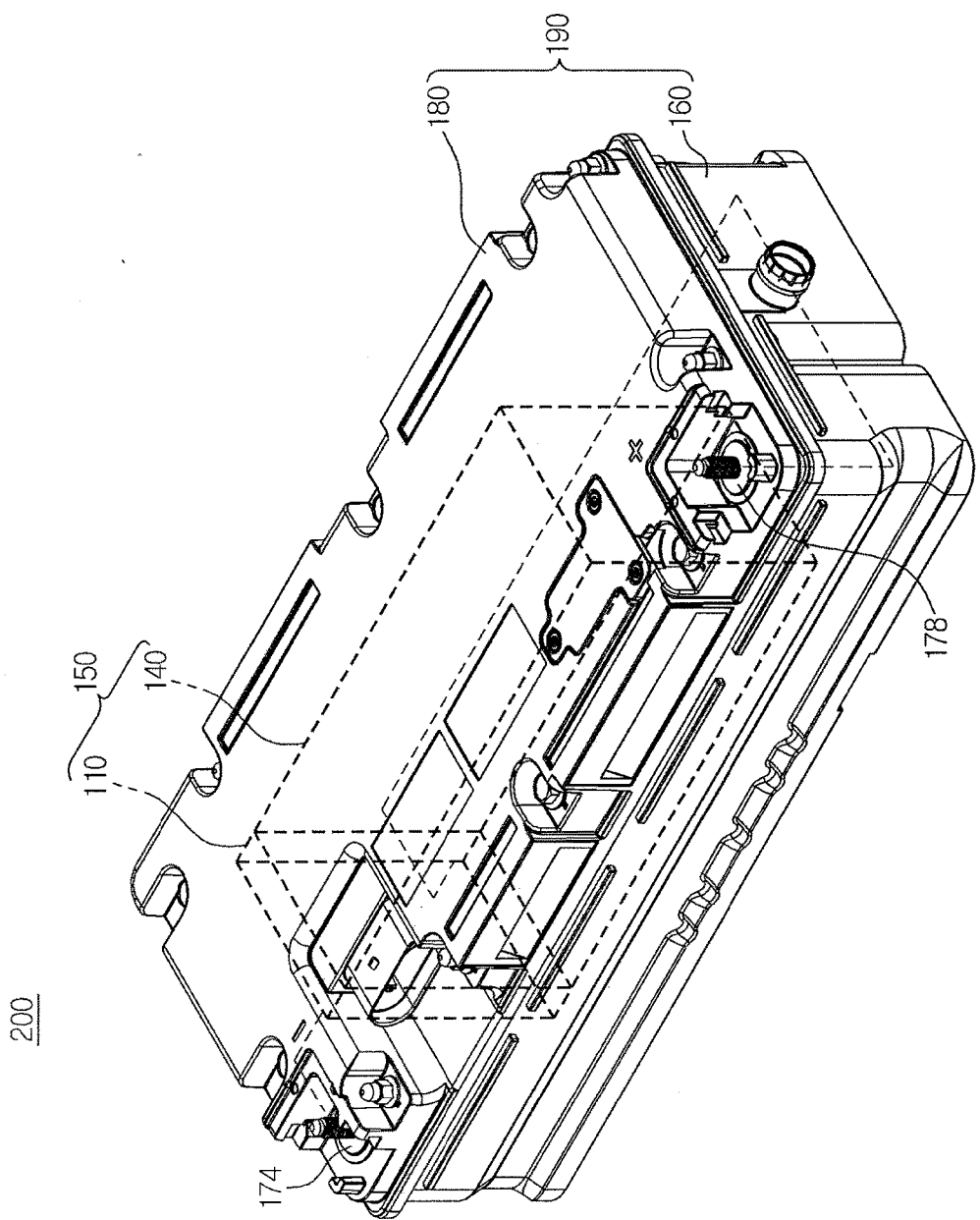
FIG. 1 is a perspective view of a battery pack according to the present disclosure.
Figure 2:
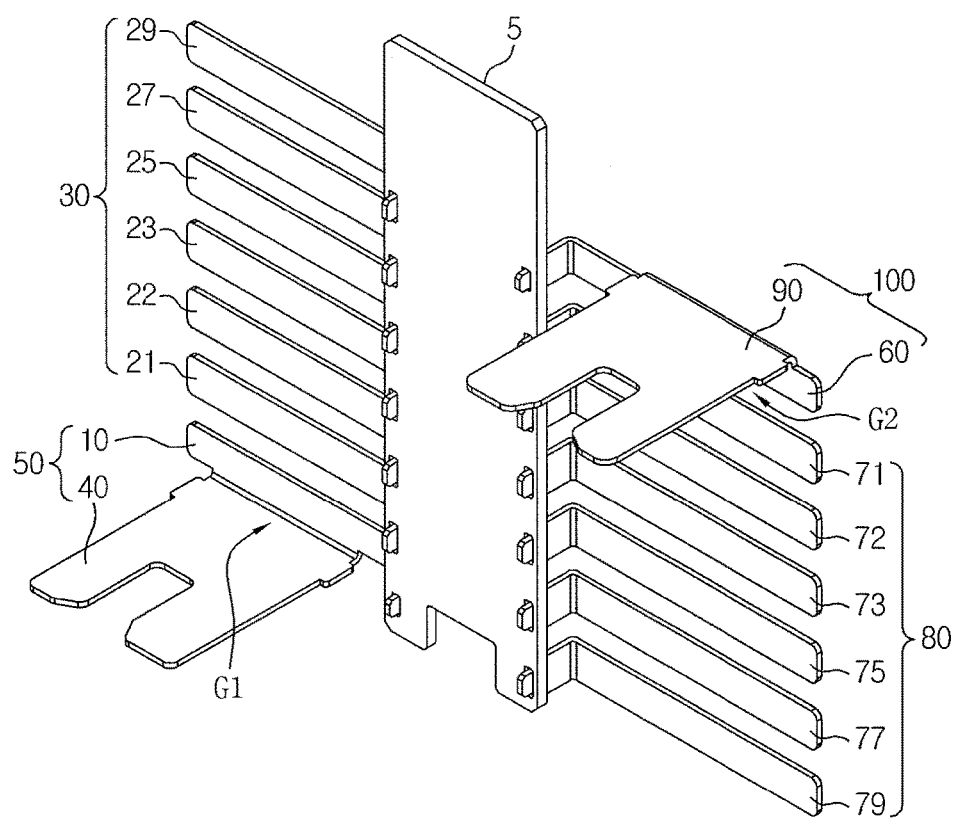
FIG. 2 is a perspective view showing an electrode lead connecting structure of FIG. 1.
Figure 3:
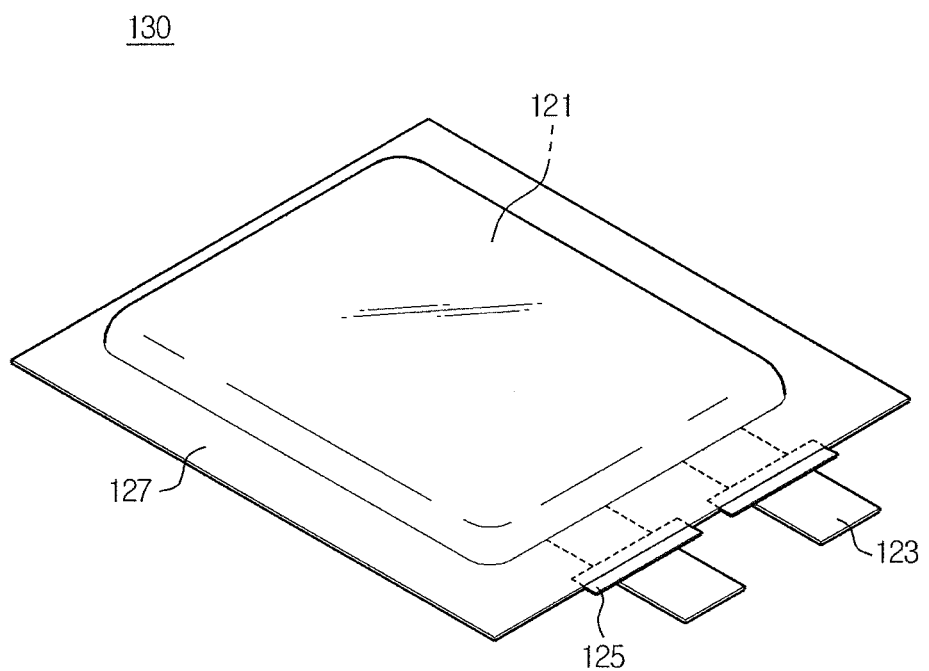
FIG. 3 is a perspective view of each battery cell included in a cell group of FIG. 1.
Figure 4:
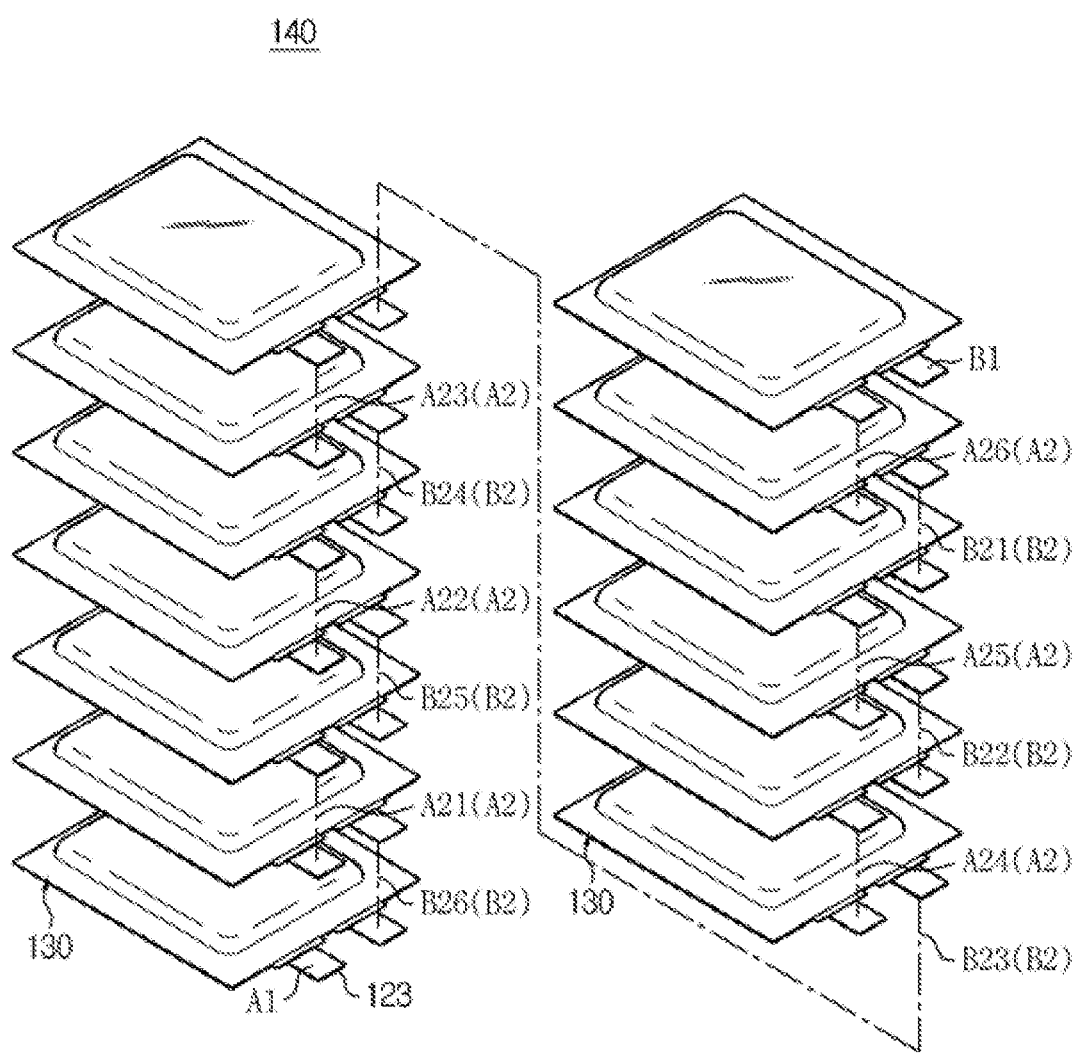
FIG. 4 is a perspective view showing electrical connection relationships among electrode leads of a plurality of battery cells of the cell group of FIG. 1.

FIG. 1 is a perspective view of a battery pack 200 according to the present disclosure, FIG. 2 is a perspective view showing an electrode lead connecting structure 110 of FIG. 1, FIG. 3 is a perspective view of each battery cell 130 included in a cell group 140 of FIG. 1, and FIG. 4 is a perspective view showing electrical connection relationships among electrode leads 123 of a plurality of battery cells 130 of the cell group 140 of FIG. 1.

Referring to FIGS. 1 and 2, the battery pack 200 includes a battery module 150 and a housing 190. The battery module 150 includes the electrode lead connecting structure 110 and the cell group 140 sequentially arranged along one direction of the battery pack 200 and connected to each other. The electrode lead connecting structure 110 is electrically connected to a battery management system (BMS) (not shown) located in the battery pack 200.

The electrode lead connecting structure 110 includes a printed circuit board 5 having an almost rectangular shape, first and second sensing busbar groups 30 and 80, and first and second electrode-integrated sensing busbars 50 and 100 facing each other in a diagonal direction. The printed circuit board 5 includes an electrical circuit pattern configured to measure a voltage of each battery cell 130 included in the cell group 140.

The first sensing busbar group 30 and the first electrode-integrated sensing busbar 50 are located at one side edge of the printed circuit board 5, and the second sensing busbar group 80 and the second electrode-integrated sensing busbar 100 are located at an opposite side edge of the printed circuit board 5. Preferably, the first electrode-integrated sensing busbar 50 includes a first L-shaped end strip busbar 10 and a first electrode busbar 40 integrated with each other.

Similarly, the second electrode-integrated sensing busbar 100 includes a second L-shaped end strip busbar 60 and a second electrode busbar 90. Herein, the first and second L-shaped end strip busbars 10 and 60 are connected to the first and second electrode busbars 40 and 90 having the highest potential and the lowest potential, or the lowest potential and the highest potential, respectively.

Each of the first and second electrode-integrated sensing busbars 50 and 100 is used to sense the voltage of the battery cell 130, input a charge current, or output a discharge current. The first sensing busbar group 30 includes first L-shaped middle strip busbars 21, 22, 23, 25, 27, and 29, and the second sensing busbar group 80 includes second L-shaped middle strip busbars 71, 72, 73, 75, 77, and 79.

The printed circuit board 5 of the electrode lead connecting structure 110 may be connected to the electrode leads 123 of the battery cells 130 of the cell group 140 through the first and second sensing busbar groups 30 and 80 and the first and second electrode-integrated sensing busbars 50 and 100. In this case, in FIGS. 3 and 4, each battery cell 130 includes two electrode leads 123 protruding in one direction.

The electrode leads 123 of the battery cells 130 contact the first and second L-shaped end strip busbars 10 and 60 and the first and second L-shaped middle strip busbars 21, 22, 23, 25, 27, 29, 71, 72, 73, 75, 77, and 79 in such a manner that the battery cells 130 are sequentially stacked on the printed circuit board 5. Each of the first and second L-shaped end strip busbars 10 and 60 and the first and second L-shaped middle strip busbars 21, 22, 23, 25, 27, 29, 71, 72, 73, 75, 77, and 79 senses the voltage of the battery cell 130.

Referring back to FIG. 1, the housing 190 surrounds the battery module 150. Preferably, the housing 190 includes a lower housing 160 and an upper housing 180 sequentially stacked on one another and detachable from each other. The lower and upper housings 160 and 180 surround and seal the battery module 150.

Herein, the upper housing 180 includes first and second external electrode terminals 174 and 178 electrically connected to the first and second electrode busbars 40 and 90 of the first and second electrode-integrated sensing busbars 50 and 100 through an inner circumferential surface thereof and protruding from an outer circumferential surface thereof. The first and second external electrode terminals 174 and 178 have opposite electrical polarities.

The electrode lead connecting structure 110 will now be described in detail with reference to FIG. 2. Herein, a forward direction of the printed circuit board 5 is a direction toward the ground surface with respect to the printed circuit board 5, and a backward direction of the printed circuit board 5 is a direction away from the ground surface with respect to the printed circuit board 5.

In the electrode lead connecting structure 110, the first L-shaped end strip busbar 10 is located in front of the printed circuit board 5 and is inserted into the printed circuit board 5 and electrically connected to the electrical circuit pattern of the printed circuit board 5, through an end thereof that is bent in an L shape. The first electrode busbar 40 protrudes downward from the first L-shaped end strip busbar 10, is perpendicularly bent in the backward direction of the printed circuit board 5, and extends in a plate shape.

Preferably, the first electrode busbar 40 protrudes from the first L-shaped end strip busbar 10 in a '⌊' shape at the one side edge of the printed circuit board 5. In another aspect, the first electrode busbar 40 is at almost right angles to the first L-shaped end strip busbar 10 and defines a first groove G1, which is open upward, together with the first L-shaped end strip busbar 10.

Similarly, the second L-shaped end strip busbar 60 is located in front of the printed circuit board 5 and is inserted into the printed circuit board 5 and electrically connected to the electrical circuit pattern of the printed circuit board 5, through an end thereof that is bent in an L shape. Herein, the second L-shaped end strip busbar 60 is located at a higher position of the printed circuit board 5 compared to the first L-shaped end strip busbar 10.

The second electrode busbar 90 protrudes upward from the second L-shaped end strip busbar 60, is perpendicularly bent in the backward direction of the printed circuit board 5, and extends in a plate shape. Preferably, the second electrode busbar 90 protrudes from the second L-shaped end strip busbar 60 in a '⌉' shape at the opposite side edge of the printed circuit board 5.

In an aspect, the second electrode busbar 90 is at almost right angles to the second L-shaped end strip busbar 60 and defines a second groove G2, which is open downward, together with the second L-shaped end strip busbar 60. Each of the first and second electrode busbars 40 and 90 has a branched structure so as to be easily coupled to a peripheral structure (not shown).

The first and second sensing busbar groups 30 and 80 are located at the one side edge and the opposite side edge of the printed circuit board 5, respectively. The first sensing busbar group 30 includes the first L-shaped middle strip busbars 21, 22, 23, 25, 27, and 29 provided at the one side edge of the printed circuit board 5. The first L-shaped middle strip busbars 21, 22, 23, 25, 27, and 29 are sequentially and regularly arranged adjacent to the first L-shaped end strip busbar 10 at a certain interval in an upward direction from the first L-shaped end strip busbar 10.

Similarly, the second sensing busbar group 80 includes the second L-shaped middle strip busbars 71, 72, 73, 75, 77, and 79 provided at the opposite side edge of the printed circuit board 5. The second L-shaped middle strip busbars 71, 72, 73, 75, 77, and 79 are sequentially and regularly arranged adjacent to the second L-shaped end strip busbar 60 at a certain interval in a downward direction from the second L-shaped end strip busbar 60. Herein, the first L-shaped middle strip busbar 29 horizontally faces the second L-shaped end strip busbar 60 of the opposite side edge of the printed circuit board 5.

The second L-shaped middle strip busbar 79 horizontally faces the first L-shaped end strip busbar 10 of the one side edge of the printed circuit board 5 at the same level. The first L-shaped middle strip busbars 21, 22, 23, 25, and 27 horizontally face the second L-shaped middle strip busbars 71, 72, 73, 75, and 77 of the opposite side edge of the printed circuit board 5 at the same level.

Each of the first and second L-shaped middle strip busbars 21, 22, 23, 25, 27, 29, 71, 72, 73, 75, 77, and 79 is inserted into the printed circuit board 5 and electrically connected to the electrical circuit pattern of the printed circuit board 5, through an end thereof that is bent in an L shape. Preferably, the first L-shaped end strip busbar 10 and the second L-shaped middle strip busbar 79, the first L-shaped middle strip busbar 29 and the second L-shaped end strip busbar 60, and the first and second L-shaped middle strip busbars 21, 22, 23, 25, 27, 71, 72, 73, 75, and 77, which face each other, protrude from the printed circuit board 5 in the forward direction of the printed circuit board 5, are bent toward two sides, and extent in directions away from each other.

Referring to FIGS. 3 and 4, the cell group 140 includes a plurality of battery cells 130, and each battery cell 130 includes an electrode assembly 121, two electrode leads 123, two sealing members 125, and an external pouch 127. The electrode assembly 121 is surrounded by an electrolyte and the external pouch 127 and then is sealed.

Ends of the electrode leads 123 are electrically connected to the electrode assembly 121 in the external pouch 127, and other ends thereof protrude from the external pouch 127. Preferably, the two electrode leads 123 protrude from the external pouch 127 in one direction.

The sealing members 125 surround the electrode leads 123 at an edge of the external pouch 127 to adhere to the external pouch 127 and the electrode leads 123. The battery cells 130 are configured by disposing a plurality of battery cells 130 of a right side of FIG. 4 on a plurality of battery cells 130 of a left side of FIG. 4.

Herein, the electrode leads 123 of the battery cells 130 are sequentially stacked on one another at left and right sides of the battery cells 130. A total number of the battery cells 130 is thirteen but is not limited thereto.

When the battery cells 130 are vertically stacked on one another, the electrode leads 123 stacked at the left side of the battery cells 130 include a bottom left electrode lead A1, and a left lead stack group A2 including paired left leads stacked on the bottom left electrode lead A1.

The electrode leads 123 stacked at the right side of the battery cells 130 include a top right electrode lead B1, and a right lead stack group B2 including paired right leads stacked on the top right electrode lead B1.

In detail, when a total of thirteen battery cells 130 are vertically stacked on one another, the left lead stack group A2 includes first to sixth left lead stacks A21, A22, A23, A24, A25, and A26 sequentially located on the bottom left electrode lead A1 in an upward direction from the bottom left electrode lead A1.

The right lead stack group B2 includes first to sixth right lead stacks B21, B22, B23, B24, B25, and B26 sequentially located in a downward direction from the top right electrode lead B1.

Herein, each of the bottom left electrode lead A1 and the top right electrode lead B1 includes one electrode lead 123 and does not configure a lead stack having two electrode leads 123. Two electrode leads 123 of each lead stack have electrically opposite polarities, and a one-dot chain line illustrated in FIG. 4 denotes a combination of two electrode leads 123.

Figure 5:
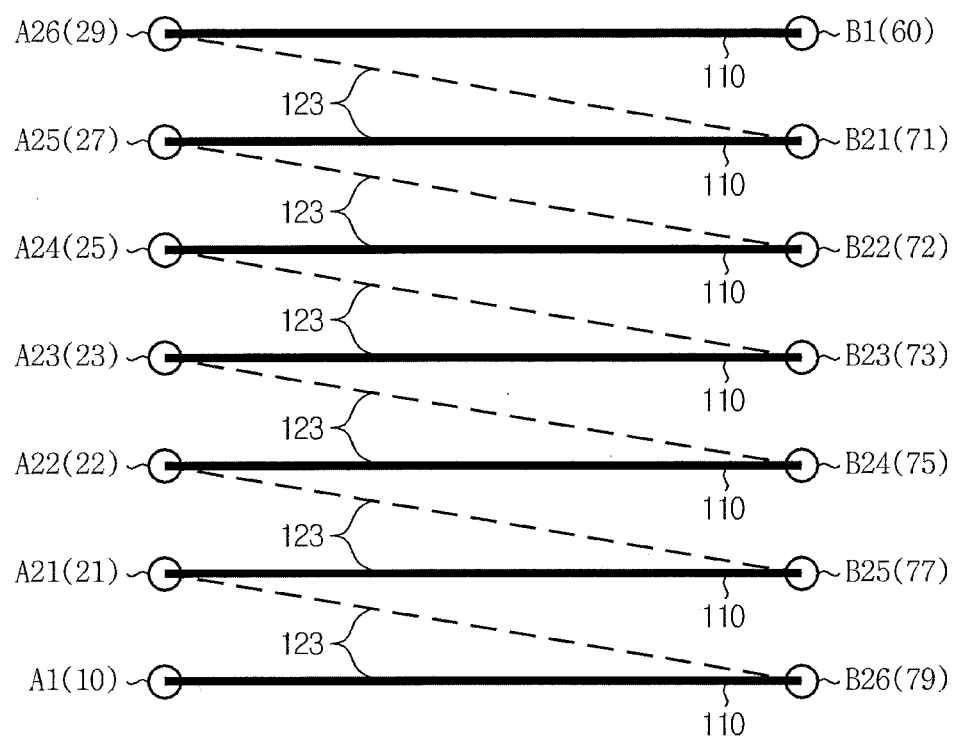
FIG. 5 is a schematic view showing coupling relationships between the electrode lead connecting structure of FIG. 2 and the cell group of FIG. 4.
Figure 6:
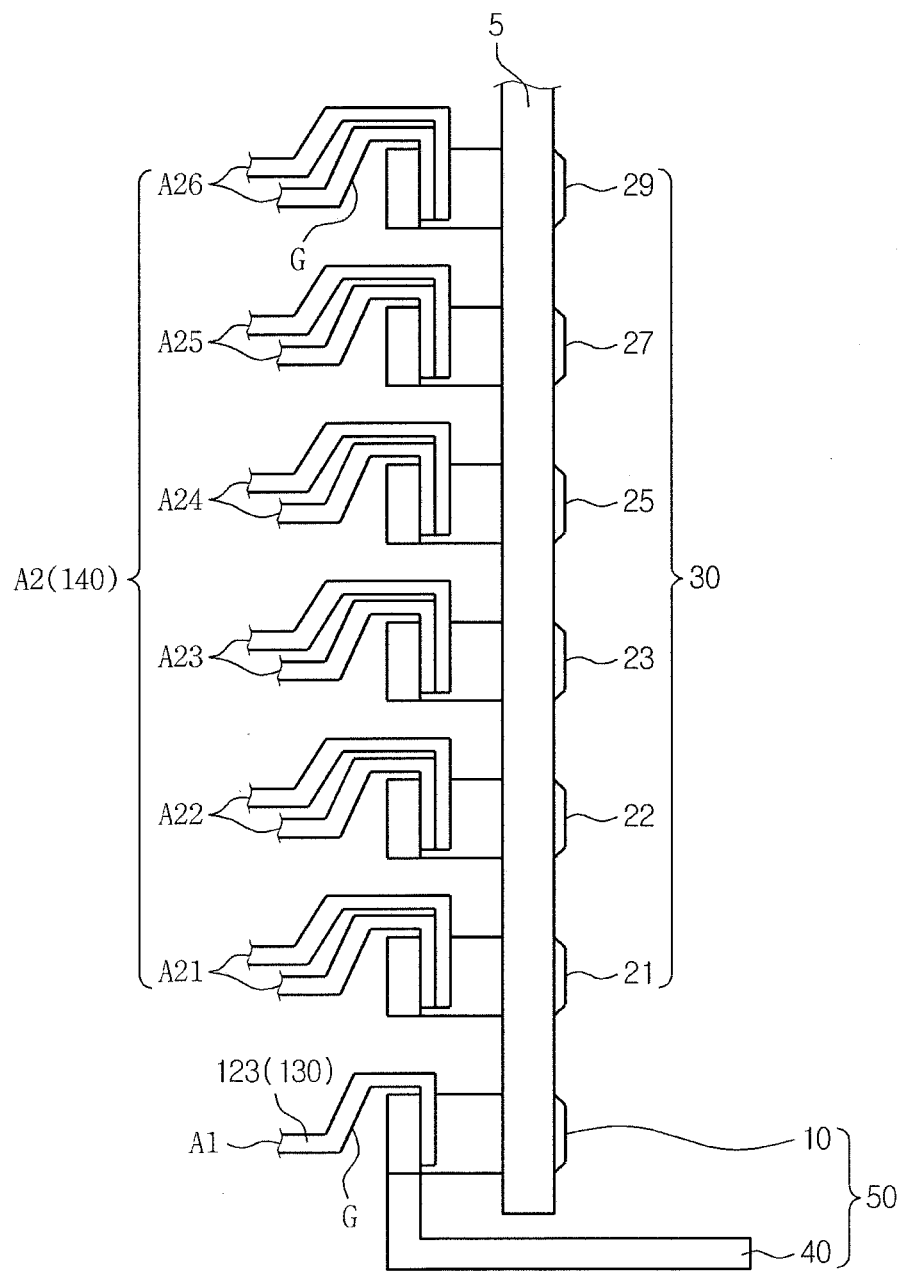
FIG. 6 is a partial side view specifically showing the coupling relationships of FIG. 5 at one side edge of a printed circuit board of FIG. 2.

FIG. 5 is a schematic view conceptually showing coupling relationships between the electrode lead connecting structure 110 of FIG. 2 and the cell group 140 of FIG. 4, and FIG. 6 is a partial side view specifically showing the coupling relationships of FIG. 5 at the one side edge of the printed circuit board 5 of FIG. 2.

Figure 7:
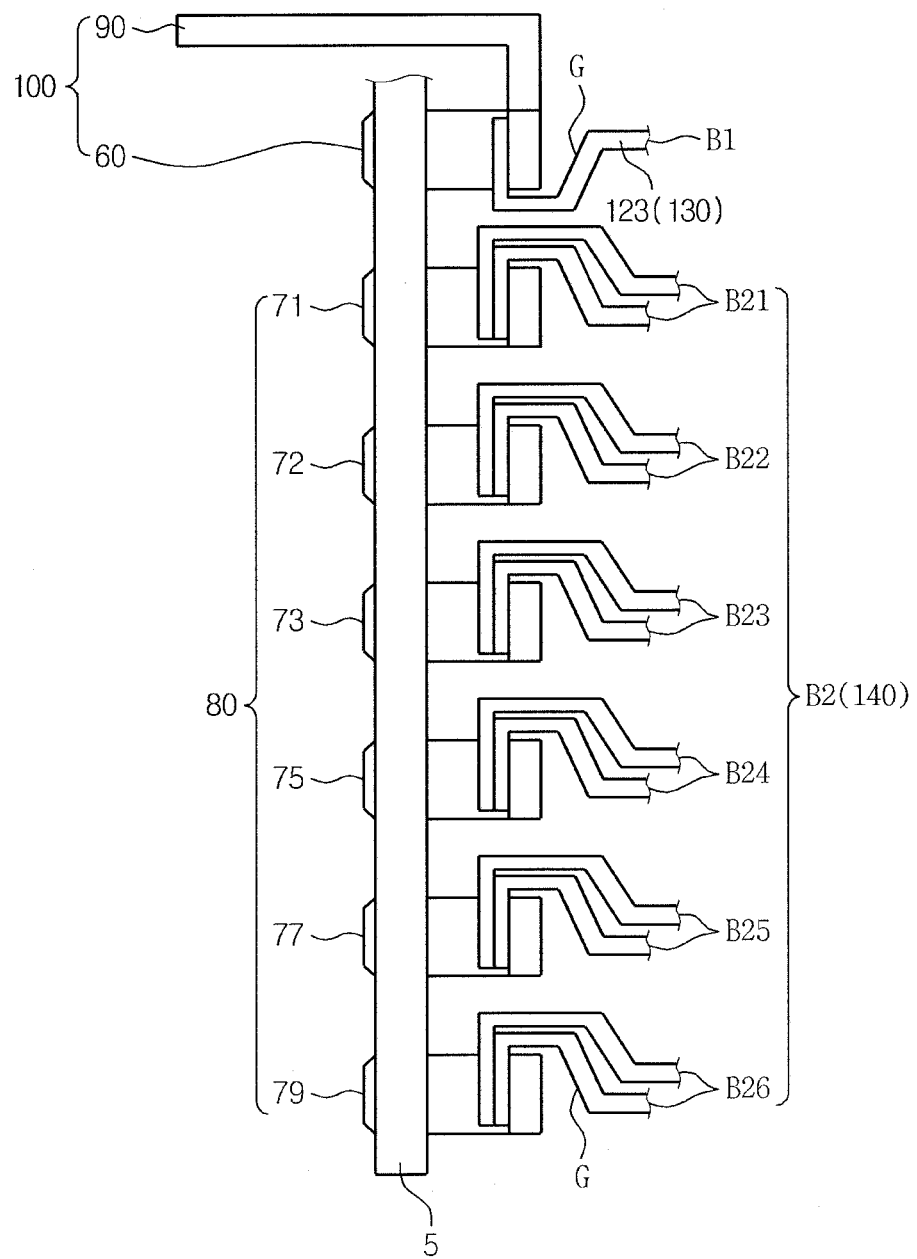
FIG. 7 is a partial side view specifically showing the coupling relationships of FIG. 5 at an opposite side edge of the printed circuit board of FIG. 2.
Figure 8:
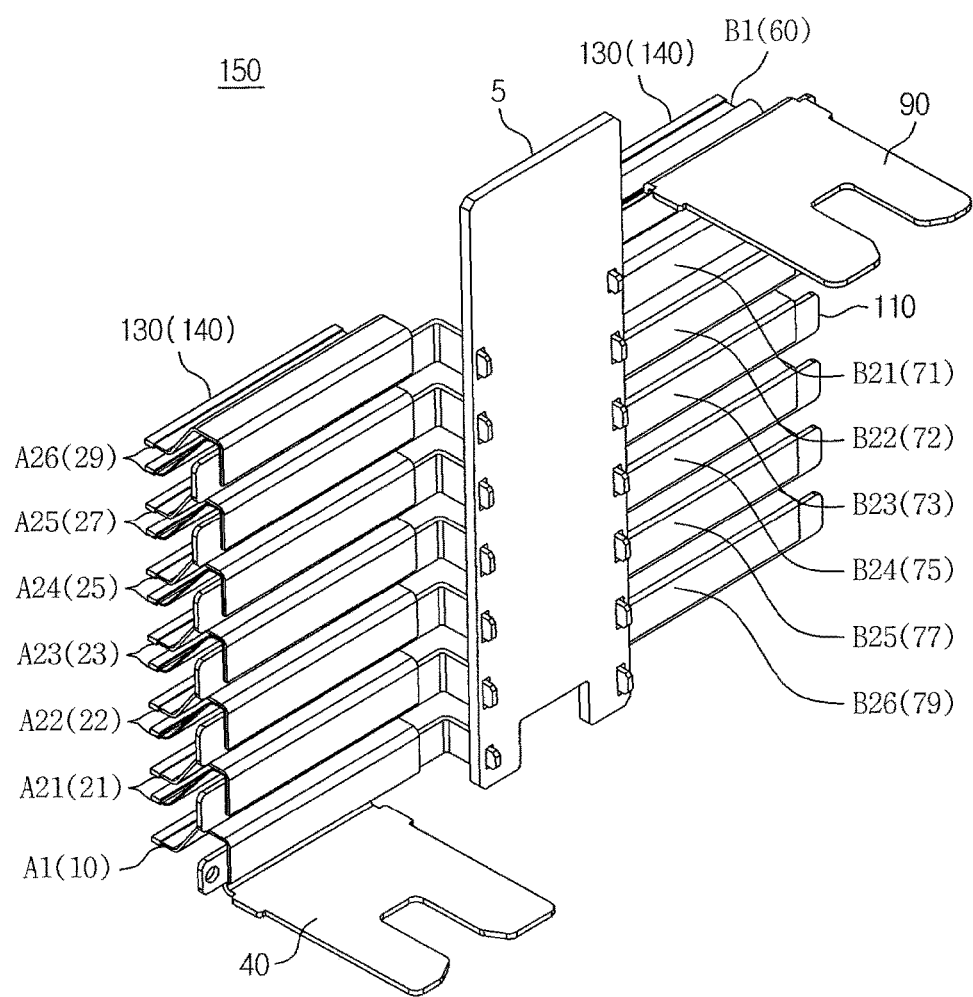
FIG. 8 is a partial perspective view specifically showing a battery module of FIG. 1.

FIG. 7 is a partial side view specifically showing the coupling relationships of FIG. 5 at the opposite side edge of the printed circuit board 5 of FIG. 2, and FIG. 8 is a partial perspective view specifically showing the battery module 150 of FIG. 1.

Referring to FIGS. 5, 6, and 8, when the cell group 140 including a total of thirteen battery cells 130 vertically stacked on one another is coupled to the electrode lead connecting structure 110, an end of the bottom left electrode lead A1 is bent to form a groove G, which is open downward in an almost '⊏'-shape, and is hooked and coupled to the first L-shaped end strip busbar 10 of the electrode lead connecting structure 110.

Herein, an inner surface of the groove G of the bottom left electrode lead A1 contacts a surface of the first L-shaped end strip busbar 10. Contact parts of the bottom left electrode lead A1 and the first L-shaped end strip busbar 10 are firmly bonded together using laser welding. An end of each of a total of twelve electrode leads 123 on the bottom left electrode lead A1 is also bent to form a groove G, which is open downward in an almost '⊏'-shape.

The grooves G of the twelve electrode leads 123 are paired to overlap each other, and the twelve electrode leads 123 configure the first to sixth left lead stacks A21, A22, A23, A24, A25, and A26 sequentially located on the bottom left electrode lead A1. The first to sixth left lead stacks A21, A22, A23, A24, A25, and A26 are hooked and coupled to the first L-shaped middle strip busbars 21, 22, 23, 25, 27, and 29 of the electrode lead connecting structure 110, respectively.

Each of the first to sixth left lead stacks A21, A22, A23, A24, A25, and A26 has two electrode leads 123, the grooves G of the two electrode leads 123 are referred to as lower and upper grooves G, and an inner surface of the lower groove G contacts a surface of each of the first L-shaped middle strip busbars 21, 22, 23, 25, 27, and 29. Contact parts of the first to sixth left lead stacks A21, A22, A23, A24, A25, and A26 and the first L-shaped middle strip busbars 21, 22, 23, 25, 27, and 29 are firmly bonded together using laser welding.

Due to the laser welding, two electrode leads 123 are bonded together through a contact surface therebetween by partially welding at least one of the two electrode leads 123 at a welding point thereof.

Referring to FIGS. 5, 7, and 8, when the cell group 140 including a total of thirteen battery cells 130 vertically stacked on one another is coupled to the electrode lead connecting structure 110, an end of the top right electrode lead B1 is bent to form a groove G, which is open upward in an almost '⊏'-shape, and is hooked and coupled to the second L-shaped end strip busbar 60 of the electrode lead connecting structure 110.

Herein, an inner surface of the groove G of the top right electrode lead B1 contacts a surface of the second L-shaped end strip busbar 60. Contact parts of the top right electrode lead B1 and the second L-shaped end strip busbar 60 are firmly bonded together using laser welding. An end of each of a total of twelve electrode leads 123 under the top right electrode lead B1 is also bent to form a groove G, which is open downward in an almost '⊏'-shape.

The grooves G of the twelve electrode leads 123 are paired to overlap each other, and the twelve electrode leads 123 configure the first to sixth right lead stacks B21, B22, B23, B24, B25, and B26 sequentially located under the top right electrode lead B1. The first to sixth right lead stacks B21, B22, B23, B24, B25, and B26 are hooked and coupled to the second L-shaped middle strip busbars 71, 72, 73, 75, 77, and 79 of the electrode lead connecting structure 110, respectively.

Each of the first to sixth right lead stacks B21, B22, B23, B24, B25, and B26 has two electrode leads 123, the grooves G of the two electrode leads 123 are referred to as lower and upper grooves G, and an inner surface of the lower groove G contacts a surface of each of the second L-shaped middle strip busbars 71, 72, 73, 75, 77, and 79. Contact parts of the first to sixth right lead stacks B21, B22, B23, B24, B25, and B26 and the second L-shaped middle strip busbars 71, 72, 73, 75, 77, and 79 are firmly bonded together using laser welding.

Due to the laser welding, two electrode leads 123 are bonded together through a contact surface therebetween by partially welding at least one of the two electrode leads 123 at a welding point thereof.

Referring to FIG. 8, overall, the battery module 150 according to an embodiment of the present disclosure includes the bottom left electrode lead A1 bonded to the first L-shaped end strip busbar 10 at the one side edge of the printed circuit board 5 of the electrode lead connecting structure 110, and the first to sixth left lead stacks A21, A22, A23, A24, A25, and A26 bonded to the first L-shaped middle strip busbars 21, 22, 23, 25, 27, and 29, respectively.

The battery module 150 further includes the top right electrode lead B1 bonded to the second L-shaped end strip busbar 60 at the opposite side edge of the printed circuit board 5 of the electrode lead connecting structure 110, and the first to sixth right lead stacks B21, B22, B23, B24, B25, and B26 bonded to the second L-shaped middle strip busbars 71, 72, 73, 75, 77, and 79, respectively.

Figure 9:
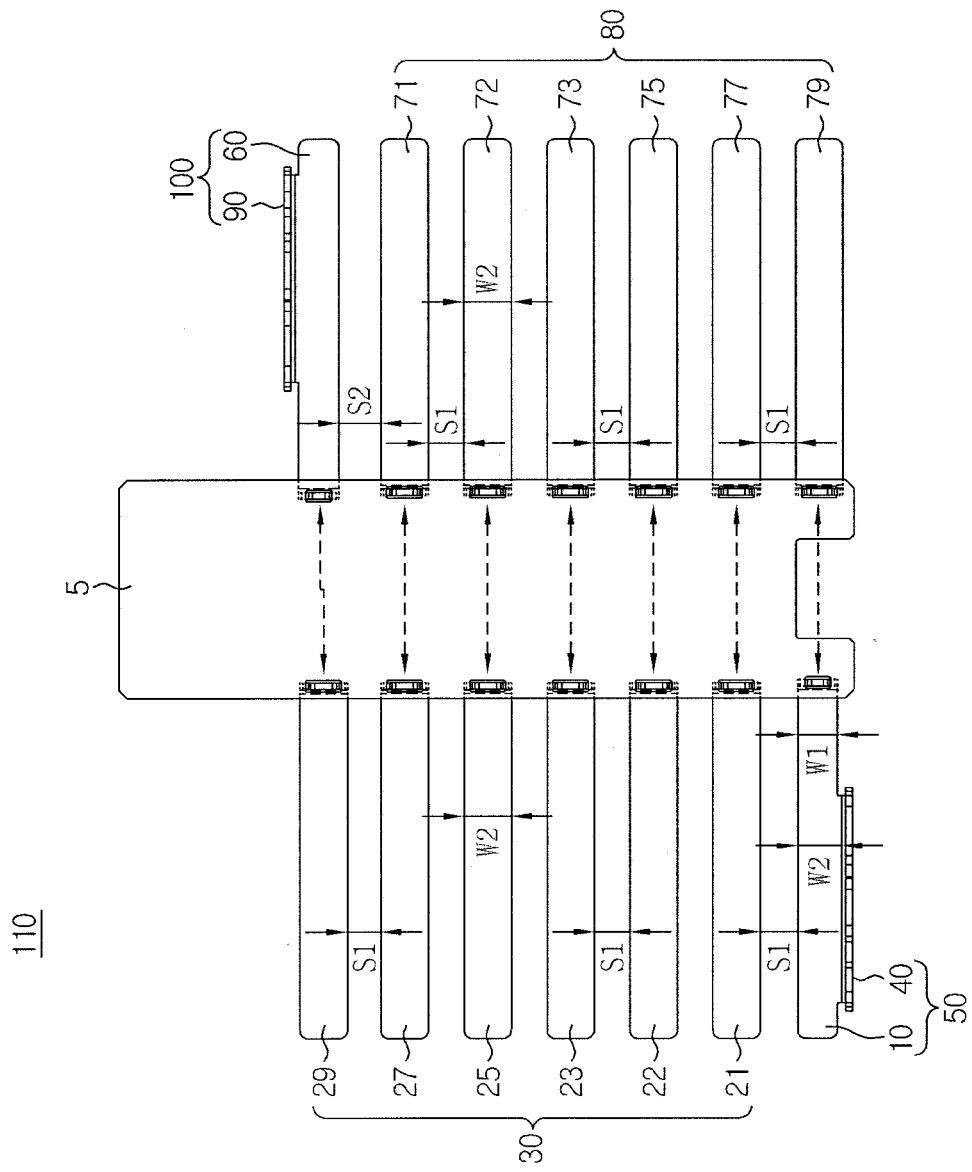
FIGS. 9 and 10 are schematic views for describing a method of manufacturing the battery module of FIG. 1.
Figure 10:
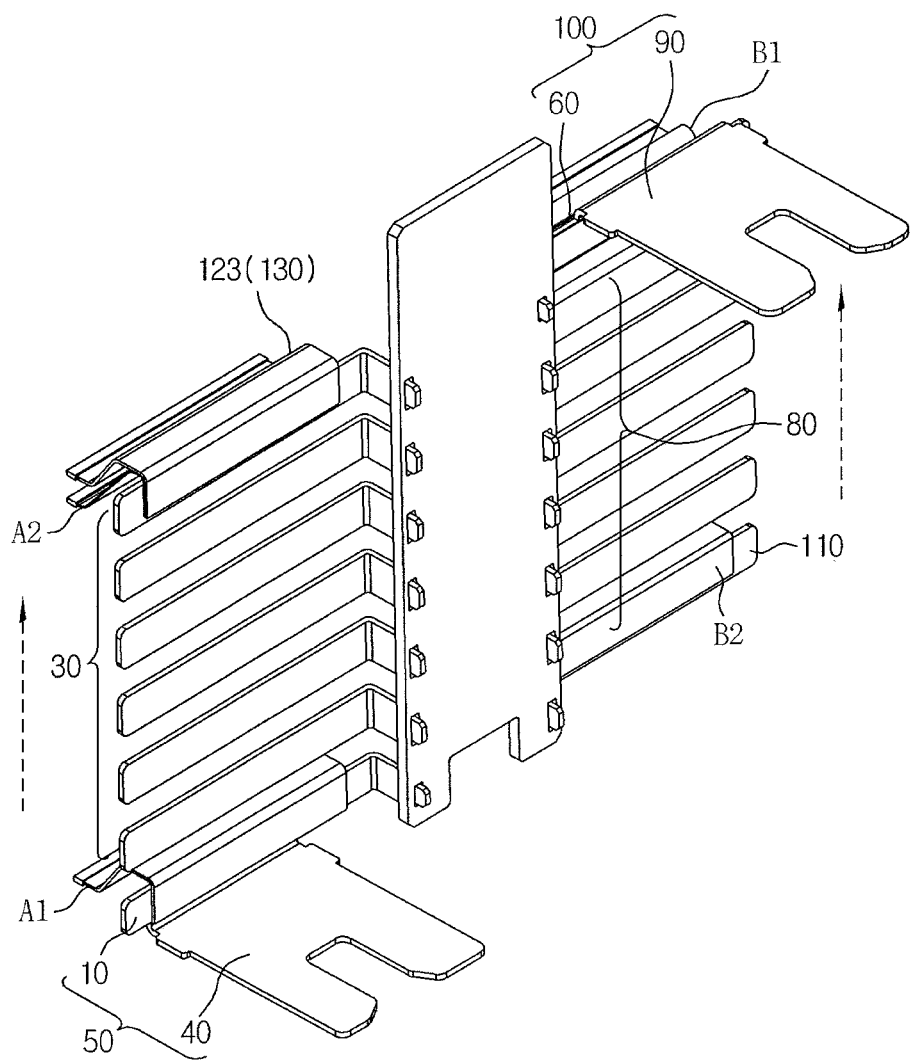

FIGS. 9 and 10 are schematic views for describing a method of manufacturing the battery module 150 of FIG. 1.

Referring to FIG. 9, the electrode lead connecting structure 110 may be prepared. The electrode lead connecting structure 110 may include the printed circuit board 5, the first and second sensing busbar groups 30 and 80 separately located at two sides of the printed circuit board 5, the first electrode-integrated sensing busbar 50 located under the first sensing busbar group 30, and the second electrode-integrated sensing busbar 100 located on the second sensing busbar group 80.

Herein, the first sensing busbar group 30 may include the first L-shaped middle strip busbars 21, 22, 23, 25, 27, and 29 arranged at a certain interval at the one side edge of the printed circuit board 5, and the second sensing busbar group 80 may include the second L-shaped middle strip busbars 71, 72, 73, 75, 77, and 79 arranged at a certain interval at the opposite side edge of the printed circuit board 5.

The first electrode-integrated sensing busbar 50 may include the first L-shaped end strip busbar 10 and the first electrode busbar 40, and the second electrode-integrated sensing busbar 100 may include the second L-shaped end strip busbar 60 and the second electrode busbar 90.

A width W2 of a central region of each of the first and second L-shaped end strip busbars 10 and 60 may be greater than a width W1 of an edge region thereof, which is adjacent to or away from the printed circuit board 5 along a length direction extending from the printed circuit board 5.

The first and second L-shaped middle strip busbars 21, 22, 23, 25, 27, 29, 71, 72, 73, 75, 77, and 79 may have the same width W2 along length directions extending from the printed circuit board 5. The first and second L-shaped end strip busbars 10 and 60 have the same length as the first and second L-shaped middle strip busbars 21, 22, 23, 25, 27, 29, 71, 72, 73, 75, 77, and 79 from the printed circuit board 5.

The first L-shaped end strip busbar 10 and the second L-shaped middle strip busbar 79, which horizontally face each other at the lowest level of the printed circuit board 5, have centers at the same level in central regions of the first L-shaped end strip busbar 10 and the second L-shaped middle strip busbar 79, and the first L-shaped middle strip busbar 29 and the second L-shaped end strip busbar 60, which horizontally face each other at the highest level of the printed circuit board 5, have centers diagonally facing each other in central regions of the first L-shaped middle strip busbar 29 and the second L-shaped end strip busbar 60.

A distance S1 between the first L-shaped end strip busbar 10 and the first L-shaped middle strip busbar 21 adjacent to the first L-shaped end strip busbar 10 at the one side edge of the printed circuit board 5 may be less than a distance S2 between the second L-shaped end strip busbar 60 and the second L-shaped middle strip busbar 71 adjacent to the second L-shaped end strip busbar 60 at the opposite side edge of the printed circuit board 5. The first and second L-shaped middle strip busbars 21, 22, 23, 25, 27, 29, 71, 72, 73, 75, 77, and 79 may be spaced apart from each other by the same distance S1 at the one side edge and the opposite side edge of the printed circuit board 5.

Referring to FIG. 10, the battery cells 130 (see FIG. 4) may be prepared. The battery cells 130 may include the electrode leads 123 extending in one direction. Then, the electrode leads 123 may be bent to form the grooves G having an almost '⊏'-shape. Thereafter, the battery cells 130 may be coupled to the electrode lead connecting structure 110 through the electrode leads 123.

Herein, as illustrated in FIGS. 6 and 7, one electrode lead 123 is coupled to each of the first and second L-shaped end strip busbars 10 and 60 and two electrode leads 123 are coupled to each of the first and second L-shaped middle strip busbars 21, 22, 23, 25, 27, 29, 71, 72, 73, 75, 77, and 79 in the electrode lead connecting structure 110.

In detail, the electrode leads 123 are hooked to each of the first and second L-shaped end strip busbars 10 and 60 through one groove G, and hooked to each of the first and second L-shaped middle strip busbars 21, 22, 23, 25, 27, 29, 71, 72, 73, 75, 77, and 79 through two grooves G.

The electrode leads 123 may configure the bottom left electrode lead A1 and the left lead stack group A2 at the one side edge of the printed circuit board 5 and configure the top right electrode lead B1 and the right lead stack group B2 at the opposite side edge of the printed circuit board 5 in the electrode lead connecting structure 110.

Then, laser welding may be performed in front of the printed circuit board 5 of the electrode lead connecting structure 110. Due to the laser welding, one electrode lead 123 may be firmly bonded to each of the first and second L-shaped end strip busbars 10 and 60 and two electrode leads 123 may be firmly bonded to each of the first and second L-shaped middle strip busbars 21, 22, 23, 25, 27, 29, 71, 72, 73, 75, 77, and 79.

Herein, the electrode lead connecting structure 110 may configure the battery module 150 according to an embodiment of the present disclosure together with the battery cells 130. Thereafter, the battery module 150 may be accommodated and sealed in the housing 190 of FIG. 1. The electrode lead connecting structure 110 of the battery module 150 may be electrically connected to the first and second external electrode terminals 174 and 178 of the housing 190. As such, the battery module 150 may configure the battery pack 200 together with the housing 190.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode lead connecting structure comprising:
   a printed circuit board having a rectangular shape and comprising an electrical circuit pattern;
   a first electrode-integrated sensing busbar comprising a first L-shaped end strip busbar electrically connected to the electrical circuit pattern at a lowest level of one side edge of the printed circuit board, and a first electrode busbar protruding downward from the first L-shaped end strip busbar, bent perpendicularly to the first L-shaped end strip busbar, and extending in a plate shape;
   a second electrode-integrated sensing busbar comprising a second L-shaped end strip busbar electrically connected to the electrical circuit pattern at a highest level of an opposite side edge of the printed circuit board, and a second electrode busbar protruding upward from the second L-shaped end strip busbar, bent perpendicularly to the second L-shaped end strip busbar, and extending in a plate shape;
   a first sensing busbar group comprising first L-shaped middle strip busbars electrically connected to the electrical circuit pattern at the one side edge and regularly arranged above the first L-shaped end strip busbar; and
   a second sensing busbar group comprising second L-shaped middle strip busbars electrically connected to the electrical circuit pattern at the opposite side edge and regularly arranged under the second L-shaped end strip busbar.

2. The electrode lead connecting structure of claim 1, wherein the second L-shaped end strip busbar is located higher than the first L-shaped end strip busbar on the printed circuit board.

3. The electrode lead connecting structure of claim 1, wherein a width of a central region of the first L-shaped end strip busbar or the second L-shaped end strip busbar is greater than a width of an edge region thereof, which is adjacent to or away from the printed circuit board along a length direction extending from the printed circuit board.

4. The electrode lead connecting structure of claim 1, wherein the first L-shaped middle strip busbars have the same width as the second L-shaped middle strip busbars along length directions extending from the printed circuit board.

5. The electrode lead connecting structure of claim 1, wherein the first L-shaped end strip busbar, the first L-shaped middle strip busbars, the second L-shaped end strip busbar, and the second L-shaped middle strip busbars are inserted into the printed circuit board and electrically connected to the electrical circuit pattern, through ends thereof that are bent in L shapes.

6. The electrode lead connecting structure of claim 1, wherein the first L-shaped end strip busbar and the first L-shaped middle strip busbars have the same length as the second L-shaped end strip busbar and the second L-shaped middle strip busbars from the printed circuit board.

7. The electrode lead connecting structure of claim 1, wherein a distance between the first L-shaped end strip busbar and a first L-shaped middle strip busbar adjacent to the first L-shaped end strip busbar is less than a distance between the second L-shaped end strip busbar and a second L-shaped middle strip busbar adjacent to the second L-shaped end strip busbar.

8. The electrode lead connecting structure of claim 1, wherein a distance between the first L-shaped middle strip busbars equals a distance between the second L-shaped middle strip busbars.

9. The electrode lead connecting structure of claim 1, wherein a distance between the first L-shaped middle strip busbars or the second L-shaped middle strip busbars equals a distance between the first L-shaped end strip busbar and a first L-shaped middle strip busbar adjacent to the first L-shaped end strip busbar, and is less than a distance between the second L-shaped end strip busbar and a second L-shaped middle strip busbar adjacent to the second L-shaped end strip busbar.

10. The electrode lead connecting structure of claim 1, wherein the first L-shaped end strip busbar and a second L-shaped middle strip busbar, which horizontally face each other at the lowest level of the printed circuit board, have centers at the same level in central regions of the first L-shaped end strip busbar and the second L-shaped middle strip busbar.

11. The electrode lead connecting structure of claim 1, wherein a first L-shaped middle strip busbar and the second L-shaped end strip busbar, which horizontally face each other at the highest level of the printed circuit board, have centers diagonally facing each other in central regions of the first L-shaped middle strip busbar and the second L-shaped end strip busbar.

12. The electrode lead connecting structure of claim 1, wherein the first electrode busbar is integrated with the first L-shaped end strip busbar, and the second electrode busbar is integrated with the second L-shaped end strip busbar.

13. The electrode lead connecting structure of claim 1, wherein the first electrode busbar and the first L-shaped end strip busbar define a groove, which is open upward, and the second electrode busbar and the second L-shaped end strip busbar define a groove, which is open downward.

14. A battery module comprising:
the electrode lead connecting structure of claim 1; and
a plurality of battery cells coupled to the electrode lead connecting structure and sequentially stacked on one another,
wherein electrode leads of the battery cells comprise a bottom left electrode lead and left lead stacks sequentially stacked on one another at a left side to extend in one direction, and right lead stacks and a top right electrode lead sequentially stacked on one another at a right side, and
wherein the bottom left electrode lead is welded to the first L-shaped end strip busbar with a bent end of the bottom left electrode lead hooked on the first L-shaped end strip busbar, each of the left lead stacks are welded to each of the first L-shaped middle strip busbars with bent ends of two electrode leads of each of the left lead stacks hooked on each of the first L-shaped middle strip busbars, the top right electrode lead is welded to the second L-shaped end strip busbar with a bent end of the top right electrode lead hooked on the second L-shaped end strip busbar, and each of the right lead stacks are welded to each of the second L-shaped middle strip busbars with bent ends of two electrode leads of each of the right lead stacks hooked on each of the second L-shaped middle strip busbars.

15. The battery module of claim 14, wherein a distance between the first L-shaped middle strip busbars or the second L-shaped middle strip busbars equals a distance between the first L-shaped end strip busbar and a first L-shaped middle strip busbar adjacent to the first L-shaped end strip busbar, and is less than a distance between the second L-shaped end strip busbar and a second L-shaped middle strip busbar adjacent to the second L-shaped end strip busbar.

* * * * *